INVENTORS
JOHN R. SIZELOVE
JOHN A. LOVE, III
BY Harry A. Herbert Jr
Robert Kern Duncan and
ATTORNEYS

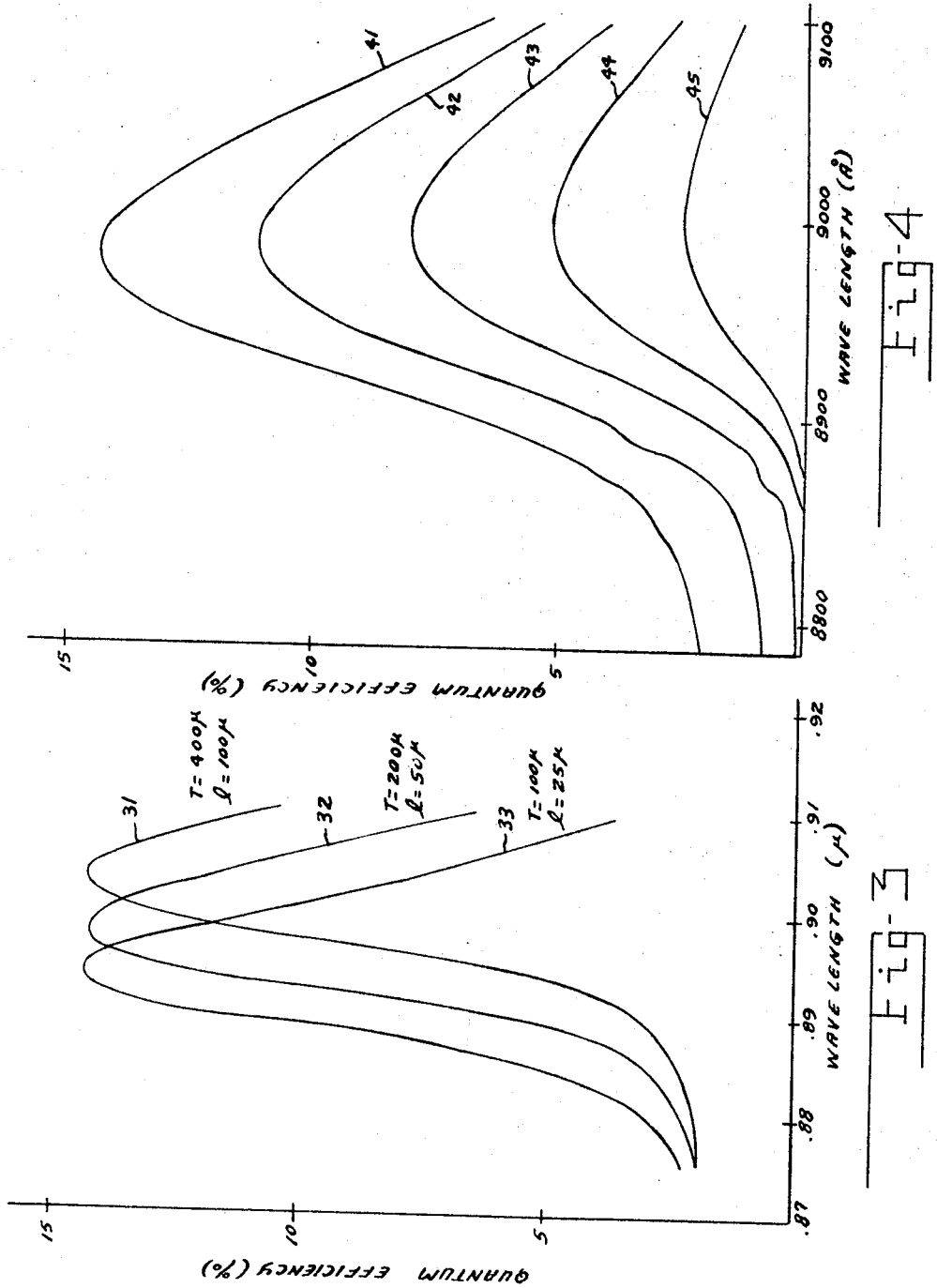

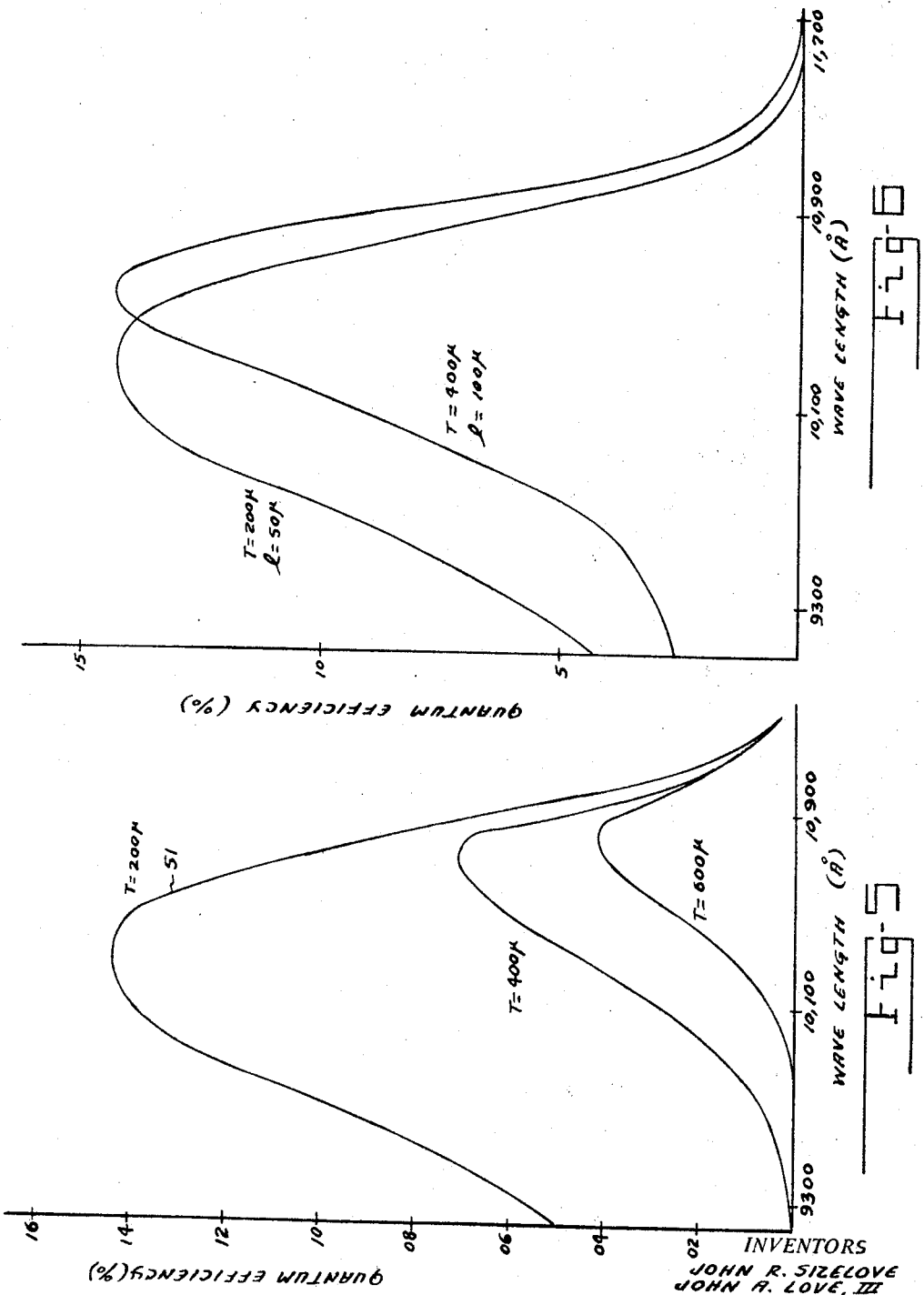

United States Patent Office 3,452,204
Patented June 24, 1969

3,452,204
LOW OHMIC SEMICONDUCTOR TUNED NARROW BANDPASS BARRIER PHOTODIODE
John A. Love III and John R. Sizelove, Dayton, Ohio, assignors to the United States of America as represented by the Secretary of the Air Force
Filed Mar. 6, 1967, Ser. No. 621,409
Int. Cl. H01j 39/12; H01l 3/00
U.S. Cl. 250—211                                    7 Claims

ABSTRACT OF THE DISCLOSURE

A low ohmic semiconductor barrier photodiode with a geometrical configuration wherein light enters the diode opposite the rectifying contact and through bulk absorption recombination action the photodiode has a narrow bandpass spectral response.

---

The invention described herein may be manufactured and used by or for the United States Government for governmental purposes without the payment to us of any royalty thereon.

Background of the invention

The field of this invention is optical receivers and detectors that provide an electrical output in response to impinging light waves, and more particularly photodiode light receivers that have a narrow spectral response, utilizing the Schottky photodiode effect.

In a light detector for detecting a frequency or relatively narrow band of frequencies it is highly desirable to limit the spectral noise response of the detector in order to improve the signal-to-noise ratio.

Prior art low ohmic photodiode optical detection systems utilize cumbersome attenuating optical filters to suppress wide band optical background noise from impinging on the optical receiver.

Summary of the invention

A low-ohmic reverse-biased barrier photodiode is disclosed that has the unique characteristics of limited spectral response through the generation of minority carriers by optical absorption in the bulk of the semiconductor material. The spectral responses for both the minimum depleted and partially depleted devices depend on the rate of variation of the absorption coefficient with wavelength, on the thickness of the absorbing region, and on the minority carrier's recombination length. Narrow spectral response exists in this device in the wavelength region wherein the absorption coefficient $\alpha$ is rapidly changing.

It is an object of this invention to provide a barrier photodiode having a narrow spectral response.

It is another object of this invention to provide an optical receiver having an improved signal-to-noise ratio due to background noise rejection.

It is another object of this invention to provide an improved detector for optical radar receivers.

It is another object of this invention to provide an improved detector for laser communication receivers.

These and other objects, such as feed-back control circuits using optical detectors, will become more apparent and the invention will be more readily understood from a consideration of the following drawing and the detailed description.

Brief description of the drawing

FIG. 3 is a graph showing typical thickness fabrication tuning curves of low ohmic gallium arsenide barrier photodiode elements;

FIG. 4 is a graph showing typical fabricated bandpass characteristic curves of gallium arsenide barrier photodiode elements;

FIG. 5 is a graph showing typical response characteristic curves of silicon barrier photodiode elements with constant recombination lengths and different element thicknesses; and FIG. 6 is a graph showing typical thickness fabrication tuning curves of silicon photodiode elements.

Description of preferred embodiments

Photodiodes are well known in the optical and electrical art. One type of well-known photodiode for providing an electrical indication of impinging light waves is known as the Schottky photodiode. It is also commonly referred to as a rectifying barrier photodiode, a blocking contact photodiode, a rectifying nonlinear photodiode, and a rectifying nonohmic photodiode. These devices comprise an N or a P type semiconductor material having an ohmic electrical contact and a rectifying electrical contact. An electrical potential difference is applied between the contacts with the ohmic contact made positive for the N type material, and negative for the P type material. The Schottky photodiode is a photodiode device characterized by minority carrier bulk recombination in a semi-conductor material providing a high quantum efficiency, and a wide band spectral response. The light to be detected normally enters the element through the rectifying contact.

The invention herein disclosed teaches the construction of a photodiode of low ohmic material that provides a narrow spectral response and that may be constructed to have a specific bandwidth at a particular center frequency.

Figure 1:
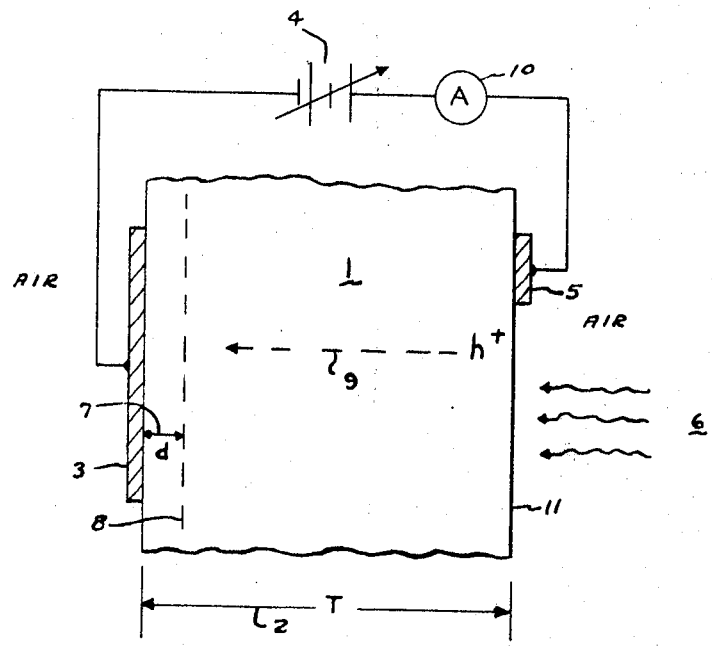
FIG. 1 is a schematic, symbolic representation of an embodiment of a low ohmic barrier photodiode having a narrow spectral response.

Referring to FIG. 1, the semiconductor element 1 may be a single crystal of low ohmic material of either N type or P type material. Such materials have typical values in the thousands of ohm centimeters such as 2000 ohm cm. for the high ohmic materials and values below one hundred such as 20 ohm cm. for the low ohmic materials. With the electrical polarities as shown, an N type material is used. The thickness 2 of the element 1 is shown as T. The rectifying contact 3, which may be a conventional gold contact, is connected to the negative side of the voltage potential 4. The rectifying contact may essentially cover the one face of the semiconductor element. It preferably is of such density as to be essentially totally reflective to light. The ohmic contact 5, which may be of conventional tin alloy material, is positioned on the opposite face of the element from the rectifying contact and is connected to the positive side of the potential source 4. It is desirable to make the ohmic contact relatively small compared to the face of the semiconductor element so that the light waves 6 may be readily admitted to and impinge essentially unobstructed on the ohmic side of the element. It is desirable to place a conventional nonreflective, impedance matching coating 11 over the aperture face of the crystal. A loss in efficiency of approximately 30 percent will result if such a coating is not in place. Instead of a small spot on the crystal face, the contact may be an annulus contact on the crystal face with the light passing through the hole in the center of the annulus. The majority carrier depleted region is represented by the space 7 between the rectifying contact 3 and the extent of the depletion region 8. Diffusion and recombination takes place in the remainder of the crystal element, that is in the region to the right of the depletion region. The depletion region is inherently formed by thermal action, photovoltaic action, and to a minor extent by the applied external voltage. It is desirable that the depletion region be quite small compared to the thickness of the element. (One percent of the thickness is a typical value.) The reverse bias potential 4 establishes the dark current of the device. The preferred value of this potential is approximately ten percent of the back breakdown (or avalanche) potential of the diode. Ammeter 10 indicates the current flowing through the diode, and the change in the value of this current from the dark current value is a direct function of the light impinging on the face of the diode.

Figure 2:
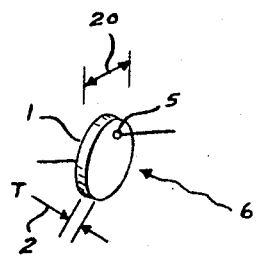
FIG. 2 is a pictorial view of the device shown symbolically in FIG. 1.

A pictorial view of the device is shown in FIG. 2. The element 1 may be a circular wafer a few thousandths of an inch thick with a typical diameter 20 being a fraction of an inch. The diameter or cross sectional configuration is not critical and may be modified to suit the application to which the device is placed.

It has been found that by using a semiconductor material having a minority carrier recombination path length of approximately ¼ the thickness of the material, having the light energy 6 impinging on the face opposite the rectifying contact, and that by the use of a voltage that positions the depth $d$ of the depletion region 7, to a very small fraction (approximately one percent) of the thickness 2 of the material so that the light photons 6 entering the semiconductor become photogenerated minority carriers 9 ($h+$) that are collected at the rectifying contact with a bulk recombination action taking place in the nondepleted region, a narrow band spectral response is obtained.

It has been found that if the light absorption coefficient $\alpha$ (at the desired center frequency) of the material used for the semiconductor element 1, times the thickness T of the semi-conductor element is made approximately 1.2 and if the ratio of the thickness T of the semiconductor element to the bulk recombination length $l$ is made approximately 4, then an optimum signal-to-noise ratio will be obtained, and that the center frequency will be at that value represented by $\alpha$T for an $\alpha$ of a particular wavelength. It is now apparent that a device may be constructed tuned to a specific center frequency from a semiconductor material by consulting the standard tables or curves of absorption coefficients for semiconductor materials and by cutting the thickness of the device so that $\alpha$T is approximately 1.2. The justification for the foregoing will become apparent, as well as how particular values may be chosen to produce modifications in the device (and its response characteristics) from the following curves and mathematical design expressions. The complete operating parameters of two operating embodiments will be set forth to be illustrative of the invention.

The curves of FIG. 3 show the pass-band characteristics of the device herein disclosed fabricated from semiconductor elements of gallium arsenide. These curves show the tuning of the device by varying the fabricated thickness of the element. In each of the three curves it is to be observed that the ratio of thickness T, to bulk recombination length $l$, is maintained constant at a value of 4, and that the quantum efficiency is also relatively constant at approximately 14 percent. For the device of curve 31, having a thcikness of 400 microns, or approximately 16 mils (thousandths of an inch), and a bulk recombination length of one hundred microns, the pass band is approximately centered about a light wavelength of approximately .9025 micron. If a device is fabricated from a similar material but having a recombination length of fifty microns and is fabricated 8 mils thick (approximately $200\mu$) it is tuned to a wavelength of approximately .8975 micron as exemplified by curve 32. Likewise a device fabricated 4 mils thick with a bulk recombination length of twenty-five microns peaks at a wavelength of approximately .894 micron (curve 33).

In each of the devices shown by the curves in FIG. 3 the ratio of the thickness of the gallium arsenide semiconductor element to the minority carrier bulk recombination path length is approximately four-to-one. The bulk recombination path length is an inherent property of the semiconductor material and at room temperature is expressed by the relationship $l=\sqrt{.025\mu_m\tau}$, wherein $\mu_m$ is the mobility of the minority carrier of the material, and $\tau$ is the mean free time for the minority carrier hole-electron bulk recombination. $\tau$ is a function of the impurity concentration in the material (or the extent to which "killer" particles are present in relatively pure material). Semiconductor materials are readily available having wide ranges of physical constants and specific materials may be obtained by specifying the basic material, such as gallium arsenide; the mobility of the minority carrier, $\mu_m$, in the material such as 500 cm.$^2$/volt-sec.; the absorption coefficient $\alpha$ of the material such as .006 per micron; the minority carrier hole-electron bulk recombination lifetime $\tau$ of the material such as $2.10^{-6}$ seconds; and $\rho$ the resistivity of the material, such as 20 ohm-centimeters. Other factors may also be specified but they need not be considered at this time.

The photodiode elements having the curves shown in FIG. 3 have been fabricated for optimum combination of narrow pass band and large response. They all have a ratio of thickness to recombination path length of four, thus they all have essentially the same pass band widths, but since the thicknesses are different they have different center frequencies.

The materials represented by the curves of FIG. 3 have different minority carrier bulk recombination path lengths. The curves of the coefficients of absorption vs. wavelength (not illustrated since they are well known) are the same for these embodiments but the operating points on these absorption curves are different providing a different absorption coefficient and its related different wavelength (as related to determining an $\alpha T \approx 1.2$). The following relationships for the thickness of the semiconductor material, T, the minority carrier bulk recombination path length $l$, and the coefficient of absorption $\alpha$ are approximately identical for all three at their center frequency and are expressed by:

$$\alpha T \approx 1.2$$
$$T/l \approx 4$$
$$\alpha l \approx 0.3$$

The well-known equation for the quantum efficiency neglecting reflections, $$y=\frac{\alpha l}{1-\alpha l}(e^{-\alpha T}-e^{T/l})$$

where $y$ is the quantum efficiency, and
$e$ is the naperian logarithm, mathematically determines the peak quantum efficiency at approximately the fourteen percent figure shown in FIG. 3 as well as the complete spectral response characteristics.

The value of T used in the foregoing calculations and description is essentially taken to be the desired optimum thickness of the material. Actually it is the design thickness of the semiconductor material minus the depth of the depletion region 7 of FIG. 1. Since it is desirable to limit the depletion region to a very small percentage of the thickness of the material, such as two microns for a semiconductor thickness of two hundred microns, the discrepancy is insignificant. The depth of the depletion region is essentially controlled by the resistivity of the material and to a minor extent by the magnitude of the reverse bias voltage 4 (FIG. 1). The depletion is also determined as a function of photo voltaic voltage and the thermal or bias voltage produced within the element. For N type materials the depletion depth $d$ in microns is approximately defined by $d=\frac{1}{2}\sqrt{\rho v}$, where $\rho$ is the resistivity in ohm centimeters and $v$ is the voltage in volts. For P type material $d$ is approximately defined by $d=\frac{1}{3}\sqrt{\rho v}$. These "rule of thumb" equations are for standard conditions. The fraction in front of the radical contains many constants.

At the expense of the quantum efficiency of the device, the bandwidth of the pass band may be modified. FIG. 4 is a plot of the bandpass characteristics of different gallium arsenide photodiode elements having different thickness-to-recombination path length ratios. The thicknesses of the semiconductor elements of all the devices of FIG. 4 are eight mils. The recombination path length of the material of curve 41 is fifty microns; thus this curve is the same curve for the same material as curve 32 of FIG. 3. Curve 42 is of material having a recombination path length of forty microns, curve 43 is of material having a recombination path length of thirty microns, curve 44 twenty microns, and curve 45 is of material having a recombination path length of ten microns. It is apparent that as the bandwidth is increased the quantum efficiency is increased.

FIG. 5 is a plot of the response curves of embodiments of this invention fabricated from silicon semiconductor material. In these three embodiments the recombination lengths are the same, i.e., 50 microns. The semiconductor material is the same. The thickness of the crystals are different, thus the $T/l$ ratios are different. Curve 51 is that of the preferred embodiment for an optimum combination of high quantum efficiency and narrow bandwidht. It has a $T/l$ ratio of four.

The tuning characteristics curves of silicon photodiode elements constructed and operated as taught herein are shown in FIG. 6. They are comparable with those curves of the gallium arsenide elements shown in FIG. 3. These curves are of the preferred embodiments of this invention (using silicon semiconductor material) for optimum quantum efficiency and sharpness of tuning, i.e., narrow bandwith. Both of these embodiments represented by these curves have an element thickness to recombination path length ratio of four, an absorption thickness product of 1.2 at the center frequency, and a quantum efficiency of approximately fourteen percent.

To aid in the practice of this invention the following operating characteristics of two embodiments will be detailed; one fabricated from low ohmic gallium arsenide material, and one from low ohmic silicon material. Both are operated in accord with the schematic diagram of FIG. 1. These values are to be considered as illustrative of this invention and not limiting.

|  | Photodiode material | |
| --- | --- | --- |
|  | Silicon | Gallium arsenide |
| Thickness of crystal element "T" (microns) | 200 | 200 |
| Inherent mean recombination path length of material "l" (microns) | 50 | 50 |
| Thus T/l is | 4 | 4 |
| Absorption coefficient α (per micron) | .006 | .006 |
| αT product | 1.2 | 1.2 |
| Resistivity of material (ohm cm.) | 20 | 10 |
| Reverse bias voltage (volt) | .8 | 1.6 |
| Depletion depth (approx.) (microns) | 2 | 2 |
| Quantum efficiency (approx.) (percent) | 14 | 14 |
| Dark current (amperes) | 10⁻⁷ | 10⁻⁷ |
| Current flow for one milliwatt of impinging monochromatic light at center frequency (ma.) | .12 | .16 |
| Wavelength center frequency of tuned band (microns) | 1.03 | .897 |
| Q (sharpness of tuning), total bandwidth over the bandwidth at half power point (approx.) | 3 | 3 |

Embodiments of photodiodes fabricated from low ohmic semiconductor materials that have a relatively narrow spectral response and that may be constructed for various center frequencies have been set forth. Sufficient teaching has been included to enable those skilled in the art to make many modifications in the fabrication and operation of the devices to suit particular applications that depart from the generally preferred embodiments having quantum efficiencies of approximately fourteen percent, thickness to recombination path length ratios of four, and absorption coefficient thickness products of approximately 1.2 at the center frequency.

What is claimed is:

1. A narrow spectral response barrier photodiode tuned to a center frequency for detecting light energy, comprising:

(a) a single crystal element having a first face and a second face and a predetermined thickness therebetween fabricated of low ohmic semiconductor material and having a ratio of element thickness to electron-hole bulk recombinaiton path length of approximately four and having an absorption coefficient-times thickness product of approximately 1.2 at the center frequency;

(b) means for providing a rectifying electrical contact on the said first face;

(c) means for providing an ohmic electrical contact on the said second face;

(d) means for admitting light energy to the said second face;

(e) voltage means cooperating with the said rectfiying contact means and the said ohmic contact means for providing a reverse bias voltage and current flow between the said rectifying contact and the said ohmic contact; and (f) means for indicating changes in the said current flow whereby the said light is detected.

2. A narrow spectral response barrier photodiode tuned to a defined center wavelength for detecting light energy comprising:

(a) an element of semiconductor material having a first face and a second face and a predetermined thickness therebetween such that the product of the said element thickness and the coefficient of absorption of the said element at the said defined center wavelength is approximately 1.2, and the said element being fabricated from semiconductor material having a bulk recombination path length such that the ratio of the said element thickness to the said bulk recombination path length is approximately four;

(b) a first electrical contact means cooperating with the said first face for providing a rectifying contact;

(c) a second electrical contact means cooperating with the said seond face for providing an ohmic contact;

(d) means for admitting light to the said second face;

(e) electrical potential means cooperating with the said first and the said second contact means, back biasing the said photodiode for providing a dark current; and (f) means for indicating an electrical current flow between the said first contact and the said second contact.

3. A barrier photodiode for detecting light energy fabricated from a single crystal of semiconductor material having a defined coefficient of absorption characteristic, a defined electron-hole bulk recombination path length, and a defined back breakdown potential, to provide a photodiode having a narrow spectral response at a determined center wavelength, the said photodiode comprising:

(a) a wafer of the said semiconductor material having a first face and a second face in essentially a parallel relationship defining a predetermined thickness therebetween, wherein (1) the said determined thickness is approximately four times the said recombination path length, and (2) the product of the said thickness and the said coefficient of absorption, at the said center wavelength is approximately 1.2;

(b) electrical contact means for providing a rectifying electrical contact on the said first face;

(c) electrical contact means for providing an ohmic electrical contact on a first portion of the said second face;

(d) nonreflective coating means on a second portion of the said second face;
(e) means for admitting light to the said second portion of the second face;
(f) voltage means cooperating with the said rectifying contact means and the said ohmic contact means for providing a reverse bias voltage approximately one-tenth the potential magnitude of the said back breakdown potential; and
(g) electrical current indicating means cooperating with the said voltage means for indicating the electrical current flowing through the said barrier photodiode.

4. The barrier photodiode as claimed in claim 3 wherein the said semiconductor material is N type material.

5. The barrier photodiode as claimed in claim 3 wherein the said semiconductor material is P type material.

6. The barrier photodiode as claimed in claim 3 wherein the said electrical contact means for providing a rectifying electrical contact comprises gold and provides a light reflective coating over essentially all of the said first face.

7. The barrier photodiode as claimed in claim 3 wherein the said electrical contact means for providing an ohmic electrical contact comprises an alloy of tin.

References Cited
UNITED STATES PATENTS

| | | | |
|---|---|---|---|
| 3,049,622 | 8/1962 | Ahlstrom et al. | 317—235 X |
| 3,205,357 | 9/1965 | Lindsay | 250—211 X |
| 3,304,429 | 2/1967 | Bonin et al. | 250—211 X |

WALTER STOHLWEIN, *Primary Examiner.*

U.S. Cl. X.R.

317—235